United States Patent
Lai

(10) Patent No.: US 11,892,816 B2
(45) Date of Patent: Feb. 6, 2024

(54) METHOD OF OPERATING TESTING SYSTEM

(71) Applicant: NANYA TECHNOLOGY CORPORATION, New Taipei (TW)

(72) Inventor: Cheng-Sung Lai, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 31 days.

(21) Appl. No.: 17/449,261

(22) Filed: Sep. 29, 2021

(65) Prior Publication Data

US 2023/0101758 A1    Mar. 30, 2023

(51) Int. Cl.
*G05B 19/4065* (2006.01)

(52) U.S. Cl.
CPC ...... *G05B 19/4065* (2013.01); *G05B 2219/14071* (2013.01)

(58) Field of Classification Search
CPC .............. G05B 19/4065; G05B 2219/14071
See application file for complete search history.

(56) References Cited

U.S. PATENT DOCUMENTS

| | | | | |
|---|---|---|---|---|
| 9,478,250 B1 * | 10/2016 | Anderson | ........... | G11B 20/1816 |
| 2004/0088601 A1 * | 5/2004 | Shah | ................... | G05B 23/0224 |
| | | | | 714/E11.144 |
| 2007/0129009 A1 * | 6/2007 | Jeong | ...................... | H04L 12/66 |
| | | | | 455/12.1 |
| 2008/0081231 A1 * | 4/2008 | Kurita | ............... | H01M 8/04768 |
| | | | | 429/513 |
| 2012/0041575 A1 * | 2/2012 | Maeda | ................. | G05B 23/024 |
| | | | | 700/79 |
| 2012/0165985 A1 * | 6/2012 | Xia | .......................... | F03D 80/50 |
| | | | | 901/1 |
| 2013/0318127 A1 * | 11/2013 | West | ................... | G01R 31/3648 |
| | | | | 707/803 |
| 2015/0088363 A1 * | 3/2015 | Besseau | ................. | B64D 45/00 |
| | | | | 701/29.6 |
| 2015/0205309 A1 * | 7/2015 | Kriss | ...................... | G05B 15/02 |
| | | | | 700/275 |
| 2017/0132578 A1 * | 5/2017 | Merg | ....................... | G07C 5/00 |
| 2018/0224499 A1 * | 8/2018 | Niu | ................... | G05B 19/41875 |
| 2021/0124343 A1 * | 4/2021 | Garcia | .............. | G05B 23/0221 |
| 2023/0213911 A1 * | 7/2023 | Feng | ................ | G05B 19/41875 |
| | | | | 700/109 |

FOREIGN PATENT DOCUMENTS

| | | | | |
|---|---|---|---|---|
| CN | 103428265 A | 12/2013 | | |
| EP | 1478008 A1 * | 11/2004 | ....... | G01R 31/31707 |
| KR | 20210012200 A * | 2/2021 | | |

* cited by examiner

*Primary Examiner* — Jennifer L Norton

(74) *Attorney, Agent, or Firm* — CKC & Partners Co., LLC

(57) ABSTRACT

A method of operating a testing system comprising a plurality of testing slots. The method comprising: testing the testing slots; obtaining a current testing data from the testing slots; determining whether one of the testing slots is abnormal by comparing the current testing data with a former testing data; shutting down the one of the testing slots and sending a repairing notification if the one of the testing slots is determined to be abnormal; performing a confirmation procedure to determine whether the one of the testing slots is repaired to be normal; and restarting the one of the testing slots if the one of the testing slots passes the confirmation procedure.

13 Claims, 3 Drawing Sheets

METHOD OF OPERATING TESTING SYSTEM

BACKGROUND

Field of Invention

The present invention relates to a method of operating a testing system.

Description of Related Art

When an inspection production line is in operation, multiple testing slots operate at the same time, and the measurement data is recorded. The main purpose is to ensure that the products meet certain specifications and performances to ensure the production quality. In addition, substandard products can be picked out from the production line, and the settings of the production line can be further improved. The main approach for determining the substandard products is determining whether the measurement data is abnormal, and the production line will automatically lock the abnormal testing slots and notify the operator for manual inspection. This automatic system for determining the abnormality of the testing slots can avoid misjudgment of good products or waste of machine capacity, and thereby improve the overall efficiency of the production line. Therefore, it is very important to set accurate judgment conditions and clear judgment procedures for the testing system.

SUMMARY

The disclosure provides a method of operating a testing system.

According to an embodiment of the present disclosure, a method of operating a testing system which includes a plurality of testing slots. The method includes: testing the testing slots; obtaining a current testing data from the testing slots; determining whether one of the testing slots is abnormal by comparing the current testing data with a former testing data; shutting down the one of the testing slots and sending a repairing notification if the one of the testing slots is determined to be abnormal; performing a confirmation procedure to determine whether the one of the testing slots is repaired to be normal; and restarting the one of the testing slots if the one of the testing slots passes the confirmation procedure.

In an embodiment of the present disclosure, the performing the confirmation procedure includes: determining whether the one of the testing slots meets a pass condition by an examination test.

In an embodiment of the present disclosure, the determining whether the one of the testing slots meets the pass condition includes: accumulating a cumulative pass number of times the one of the testing slots has passed the examination test; and determining whether the cumulative pass number is greater than or equal to a first predetermined number.

In an embodiment of the present disclosure, when the cumulative pass number is less than the first predetermined number, the determining whether the one of the testing slots meets the pass condition further includes: performing the examination test to the one of the testing slots continuously when the cumulative pass number is less than the first predetermined number.

In an embodiment of the present disclosure, the first predetermined number is 3.

In an embodiment of the present disclosure, when the one of the testing slots is determined as not meeting the pass condition, the method includes: collecting a fail data of the one of the testing slots from the examination test; and determining whether the fail data is abnormal.

In an embodiment of the present disclosure, the determining whether the fail data is abnormal includes: predetermining a plurality of shutting down conditions; and determining whether the fail data meets at least one of shutting down conditions.

In an embodiment of the present disclosure, the determining whether the fail data meets the at least one of shutting down conditions includes: determining the fail data is abnormal when the fail data meets at least one of the shutting down conditions; and zeroing a cumulative pass number of times the one of the testing slots has passed the examination test.

In an embodiment of the present disclosure, the determining whether the fail data meets at least one of shutting down conditions includes: determining the fail data is normal when the fail data does not meet any of the shutting down conditions; and performing the examination test to the one of the testing slots continuously when the cumulative pass number is less than the first predetermined number.

In an embodiment of the present disclosure, the shutting down the one of the testing slots and sending the repairing notification includes: sending an abnormal notification record.

In an embodiment of the present disclosure, the determining whether one of the testing slots is abnormal includes: predetermining a plurality of shutting down conditions; revising the former testing data with the current testing data to generate a revised data; comparing the former testing data and the revised data to obtain at least one difference; and determining whether the difference meets one of the shutting down conditions.

In an embodiment of the present disclosure, the former testing data, the current testing data, and the revised data are stored in a cloud database.

In an embodiment of the present disclosure, the shutting down conditions include a first condition and a second condition, and the first condition is that the difference is greater than a predetermined range.

In an embodiment of the present disclosure, the second condition is that a number of times the difference meets the first condition is greater than or equal to a second predetermined number.

In an embodiment of the present disclosure, when the first condition and the second condition are met at the same time, the one of the testing slots is abnormal.

In an embodiment of the present disclosure, the second predetermined number is in a range from about 1 to about 3.

In the aforementioned embodiments of the present disclosure, the method of operating a testing system can combine with any automatic manufacturing situation to make the control of manufacturing process more effectively. By performing the confirmation procedure, the testing cost for the products can be lowered down. Since the confirmation procedure can exclude the abnormal testing slots automatically, the cost for testing abnormal slots is reduced. Furthermore, the confirmation procedure can ensure reliability of the manual inspection for repairing the abnormal testing slots.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
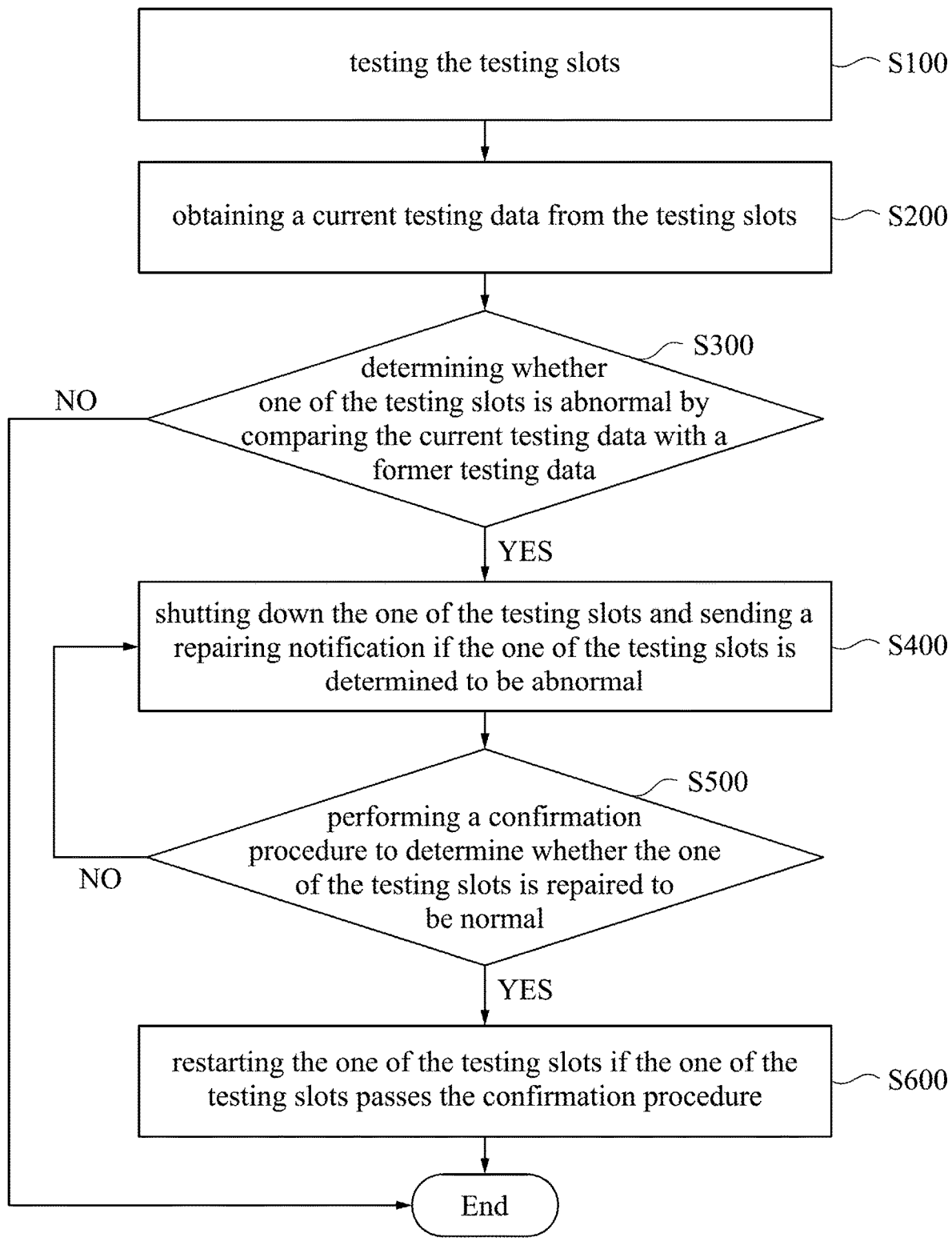
FIG. 1 illustrates a flow chart of a method of operating a testing system according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a flow chart of a method M1 of operating a testing system according to one embodiment of the present disclosure. The testing system includes a plurality of testing slots. The method M1 includes: testing the testing slots (step S100); obtaining a current testing data from the testing slots (step S200); determining whether one of the testing slots is abnormal by comparing the current testing data with a former testing data (step S300); shutting down the one of the testing slots and sending a repairing notification if the one of the testing slots is determined to be abnormal (step S400); performing a confirmation procedure to determine whether the one of the testing slots is repaired to be normal (S500); and restarting the one of the testing slots if the one of the testing slots passes the confirmation procedure (step S600).

The method M1 of this disclosure can combine with any automatic manufacturing situation, for example, an automatic production line. The advantage of combining the method M1 to the production line is to control the manufacturing process more effectively. In the following embodiments or examples, the method M1 may combine with the production line, at least one controller, or both of them at the same time, but the present disclosure is not limited to this. Specifically, the production line may include many testing equipment for testing products. The testing equipment may include multiple testing slots to contain test products. The testing slots of the testing equipment can obtain current testing data for each product.

Reference is made to FIG. 1. The at least one controller can record the current testing data for each product separately. The recorded current testing data of each product are saved for every test. By comparing the current testing data of these testing slots with former testing data, the at least one controller can determine whether the status of the product is normal or abnormal. The reason to compare the current testing data with the former testing data is that the abnormal current testing data will have large difference relative to the former testing data The large difference of the abnormal current testing data may be caused by the measurement or the product properties. Specifically, the current testing data is processed before being compared with the former testing data. The detail of processing the current testing data will be described in the following paragraphs. If the difference between the current testing data and the former testing data meets shutting down conditions, the at least one controller will automatically shut down the testing slots. The shutting down conditions can be a set ranges or values, but the present disclosure is not limited to this. According the result of the comparison of the current testing data and the former testing data, the testing slots can be determined as normal or abnormal.

The reason that the at least one controller shuts down the abnormal testing slots is to reduce the probability of misjudgment to the normal testing slots and abnormal testing slots. If the abnormal testing slots are not shut down, the abnormal testing slots will continue performing subsequent tests together with the normal testing slots. In this way, obtaining current testing data from the abnormal testing slots will waste the testing time of the testing equipment, and thus slow down the efficiency of the testing equipment.

After the at least one controller shuts down the abnormal testing slots, a repairing notification will be sent to the operators at the same time. Sending the repairing notification to the operators can remind the operators to perform the manual inspection to the abnormal testing slots as soon as possible. After the manual inspection is completed, the at least one controller will perform a confirmation procedure to ensure that the manual inspection has repaired the abnormal testing slots. The repaired abnormal testing slots that pass the confirmation procedure will be labeled as normal and restarted for the subsequent tests. If the repaired abnormal testing slots fail to pass the confirmation procedure, the repaired abnormal testing slots will be shut down and labeled as abnormal again. The repairing notification will be sent to the operator again.

The confirmation procedure can ensure the reliability of the manual inspection. Specifically, if the at least one controller does not include the confirmation procedure, it will take a longer time to determine the abnormal state. The repaired testing slots are restarted to go through the steps S100-S400 to determine the abnormal testing slots, which will take a longer time (compare to performing a confirmation procedure right after the manual inspection). Therefore, performing the confirmation procedure can confirm the state of the testing slots and further reduce the testing time. The details of the method M1 will be described below.

Figure 2:
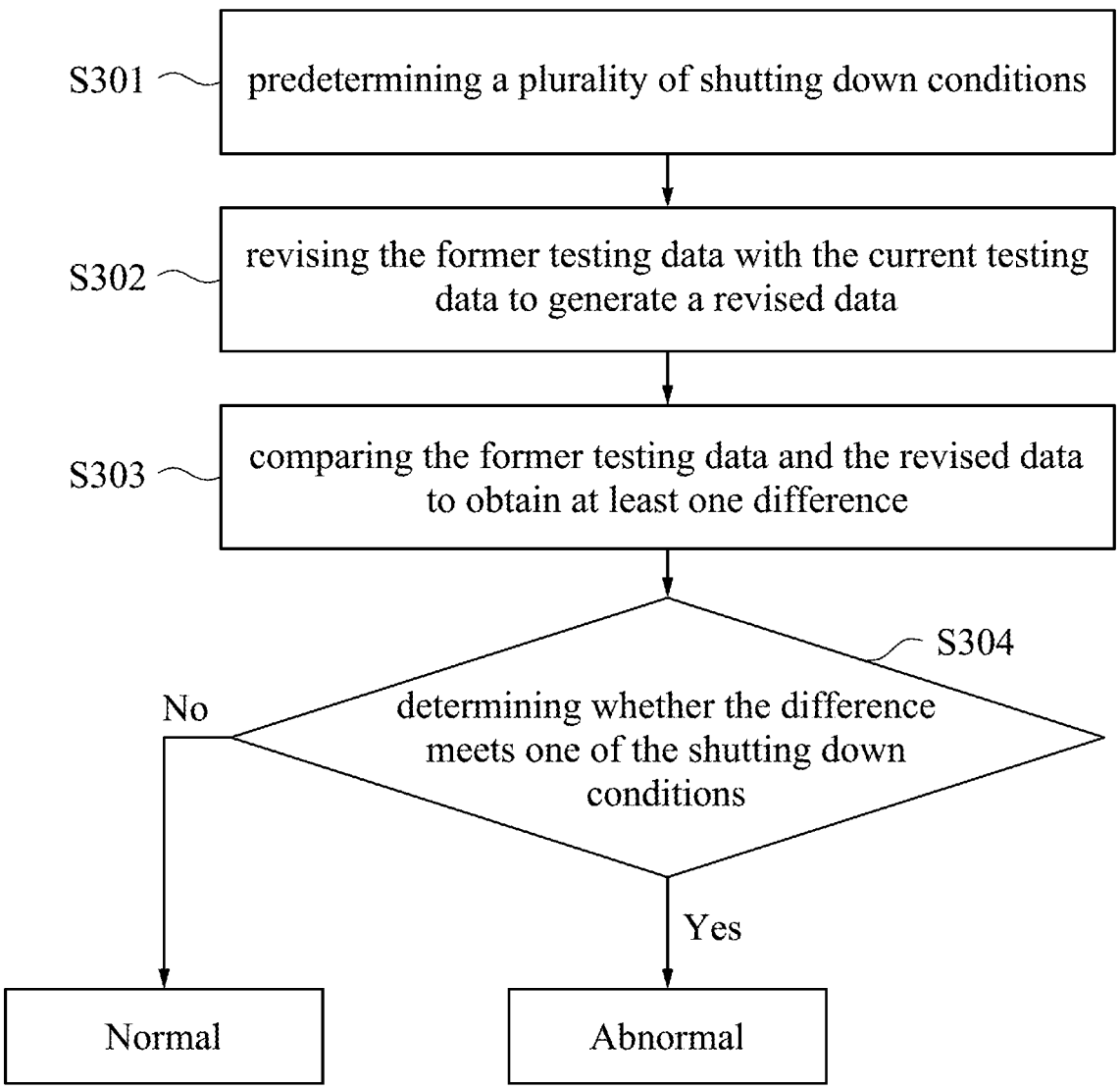
FIG. 2 illustrates a part of the flow chart of the method according to one embodiment of the present disclosure.

FIG. 2 illustrates a part of the flow chart of the method M1 according to one embodiment of the present disclosure. References are made to FIG. 1 and FIG. 2. Step S300 includes: predetermining a plurality of shutting down conditions (step S301); revising the former testing data with the current testing data to generate a revised data (step S302); comparing the former testing data and the revised data to obtain at least one difference (step S303); and determining whether the difference meets one of the shutting down conditions (step S304). If the difference meets one of the shutting down conditions, the one of the testing slots is abnormal. If the difference does not meet any of the shutting down conditions, the testing slots are normal. In some embodiments, the former testing data and the revised data are stored in a cloud database, but the disclosure is not limited to this.

Specifically, all the testing data can be upload to or download from a cloud database. The at least one controller can download the former testing data from the cloud database. In addition, the obtained current testing data can be used to create a revised data by filling the current testing data in to the format downloaded from the cloud database, and the revised data can be uploaded back to the cloud database. The purpose of using the cloud database is to access all the testing data at anytime and anywhere for analyzing or checking the condition of at least one controller. By analyzing the cloud database, the parameters or settings of the at least one controller can be improved. Moreover, after comparing the former testing data with the revised data, a difference can be obtained. The difference between the former testing data and the revised data will be compared to the shutting down conditions and determined if the testing slots are abnormal. The detail of the abnormal determination of the testing slots will be described in the following descriptions.

Reference is made to FIG. 2. In some embodiments, the shutting down conditions include a first condition and a second condition, and the first condition is that the difference is greater than a predetermined range, but the present disclosure is not limited to this. In some embodiments, the second condition is that a number of times the difference meets the first condition is greater than or equal to a second predetermined number, but the present disclosure is not limited to this. In some embodiments, the second predetermined number is in a range from about 1 to about 3, but the present disclosure is not limited to this. For example, the first condition can be a certain range of some parameters in the testing data, and the second condition can be the total time for the testing slots to meet the first condition. In some embodiments, when the first condition and the second condition are met at the same time, the one of the testing slots is abnormal, but the present disclosure is not limited by this.

For example, assumed that the first condition is a range of a certain parameter of the testing data, and the second condition is the total time for the testing slots to meet the first condition (e.g. the second condition is to meet the first condition for 3 times). When the difference between the former testing data and the revised data meet the first condition for the first time, the at least one controller will determine that the testing slot is normal and continues the following testing. When the difference between the former testing data and the revised data meets the first condition for 3 times, the at least one controller will determine that the testing slot meets the shutting down conditions, since the first condition and the second condition are met at the same time. The at least one controller will shut down the testing slot automatically. The testing slots that are shut down will be labeled as abnormal and manually inspected.

Reference is made to FIG. 1. After the abnormal testing slots are shut down, a repairing notification will be send to the operator to perform a manual inspection to the abnormal testing slots. In some embodiments, step S400 further includes: sending an abnormal notification record, but the present disclosure is not limited to this. The abnormal notification record can be an abnormal notification of the production line. Since the method M1 combine with the production line, the at least one controller can send the abnormal notification of the production line while sending the repairing notification to the operator. The abnormal notification of the production line can record and track the status and problems of the production line, so as to improve the setting of the production line.

Figure 3:
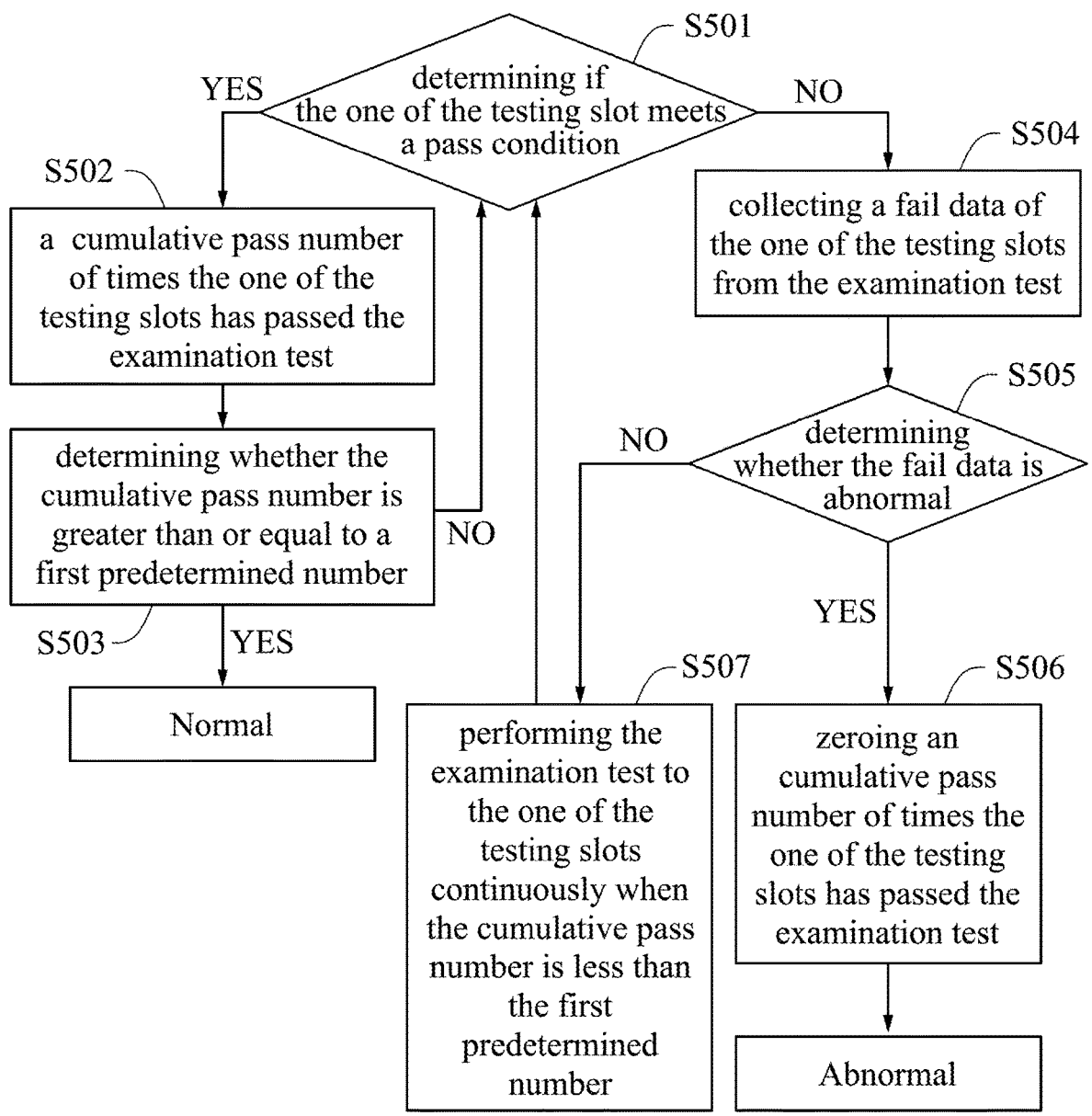
FIG. 3 illustrates another part of the flow chart of the method according to one embodiment of the present disclosure.

FIG. 3 illustrates another part of the flow chart of the method M1 according to one embodiment of the present disclosure. In some embodiments, step S500 includes: determining if the one of the testing slot meets a pass condition (step S501). Specifically, after the manual inspection is performed to the abnormal testing slots, the operator will restart the at least one controller. The at least one controller will then perform a confirmation procedure. Performing a confirmation procedure can ensure the reliability of the manual inspection. Moreover, performing the confirmation procedure can reduce testing time and testing cost. To determine if the testing slots pass the confirmation procedure, specific pass conditions can be set to compare with the testing data.

Reference is made to FIG. 3. In some embodiments, step S500 further includes: accumulating a cumulative pass number of times the one of the testing slots has passed the examination test (step S502); and determining whether the cumulative pass number is greater than or equal to a first predetermined number (step S503), but the present disclosure is not limited to this. In some other embodiments, when the cumulative pass number is less than the first predetermined number, step S500 further includes: performing the examination test to the one of the testing slots continuously when the cumulative pass number is less than the first predetermined number (step S507), but the present disclosure is not limited to this. In some embodiments, the first predetermined number is 3, but the present disclosure is not limited by this.

For example, when a repaired abnormal testing slot passes the confirmation procedure, the cumulative pass number of the repaired abnormal testing slot will plus one. When the same repaired abnormal testing slot passes the confirmation procedure repeatedly, the cumulative pass number of the repaired abnormal testing slot will be cumulated. After the cumulative pass number of the repaired abnormal testing slot is larger than or equal to a first predetermined number, the at least one controller will determine that the repaired abnormal testing slot meets the pass condition. On the contrary, if the cumulative pass number of the repaired abnormal testing slot is less than the first predetermined number, the at least one controller will continue to perform the confirmation procedure to the repaired abnormal testing slot until the cumulative pass number of repaired abnormal testing slot meets the first predetermined number. The purpose of setting the first predetermined number and perform the confirmation procedure until the cumulative pass number of repaired abnormal testing slot meets the first predetermined number is to reduce the misjudgment of the examination test.

In some embodiments, when the one of the testing slots is determined as not meeting the pass condition, step S500 further includes: collecting a fail data of the one of the testing slots from the examination test (step S504), and determining whether the fail data is abnormal (step S505). In some embodiments, step S505 includes: predetermining a plurality of shutting down conditions (step S505a), and determining whether the fail data meets at least one of shutting down conditions (step S505b), but the present disclosure is not limited to this. Specifically, in the case that the repaired abnormal testing slot does not pass the confirmation procedure, a fail data of the repaired abnormal testing slot will be gathered and compared with the shutting down conditions. The purpose of comparing the fail data with shutting down conditions is to confirm whether the repaired abnormal testing slot is abnormal or not.

If the fail data of the repaired abnormal testing slot meets one of the shutting down conditions, the repaired abnormal testing slot will be labeled as abnormal and the at least one controller will shut down the abnormal testing slot and sending a repairing notification. In some embodiments, step S500 further includes: zeroing a cumulative pass number of times the one of the testing slots has passed the examination test if the determination result of step S505 is YES (step S506), but the present disclosure is not limited by this. Moreover, while comparing the fail data of the repaired abnormal testing slot with the shutting down conditions, the cumulated pass number of the repaired abnormal testing slot will be zeroed if the testing slot is labeled as abnormal. The reason of zeroing the cumulated pass number of the repaired abnormal testing slot is to confirm that all the abnormal testing slots follow the same procedure and increase the reliability of the at least one controller.

In some embodiments, step S500 further includes: performing the examination test to the one of the testing slots continuously when the cumulative pass number is less than the first predetermined number if the determination result of step S505 is NO (step S507), but the present disclosure is not limited by this. Specifically, when the fail data of the repaired abnormal testing slot does not meet any of the shutting down condition, the at least one controller will continue performing the confirmation procedure to accumulate the cumulated pass number of the repaired abnormal testing slot. In addition, when the fail data of the repaired abnormal testing slot does not meet any of the shutting down condition, the cumulative pass number of the testing slot will not be zeroed, bur the present disclosure is not limited to this. Specifically, step S506 and step S507 can double confirm the correctness of step S501 and thus save time for performing extra examination tests.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of operating a testing system comprising a plurality of testing slots, the method comprising:
   testing the plurality of testing slots;
   obtaining a current testing data from the plurality of testing slots;
   determining whether one of the plurality of testing slots is abnormal by comparing the current testing data with a former testing data;
   shutting down the one of the plurality of testing slots and sending a repairing notification if the one of the plurality of testing slots is determined to be abnormal;
   performing a confirmation procedure to determine whether the one of the plurality of testing slots is repaired to be normal; and
   restarting the one of the plurality of testing slots if the one of the plurality of testing slots passes the confirmation procedure,
   wherein performing the confirmation procedure comprises:
      determining whether the one of the plurality of testing slots meets a pass condition by an examination test;
      accumulating a cumulative pass number of times the one of the plurality of testing slots has passed the examination test; and
      determining whether the cumulative pass number is greater than or equal to a first predetermined number.

2. The method of claim 1, wherein when the cumulative pass number is less than the first predetermined number, the determining whether the one of the plurality of testing slots meets the pass condition further comprises:
   performing the examination test to the one of the plurality of testing slots continuously when the cumulative pass number is less than the first predetermined number.

3. The method of claim 1, wherein the first predetermined number is 3.

4. The method of claim 1, wherein when the one of the plurality of testing slots is determined as not meeting the pass condition, the method comprises:
   collecting a fail data of the one of the plurality of testing slots from the examination test; and
   determining whether the fail data is abnormal.

5. A method of operating a testing system comprising a plurality of testing slots, the method comprising:
   testing the plurality of testing slots;
   obtaining a current testing data from the plurality of testing slots;
   determining whether one of the plurality of testing slots is abnormal by comparing the current testing data with a former testing data;
   shutting down the one of the plurality of testing slots and sending a repairing notification if the one of the plurality of testing slots is determined to be abnormal;
   performing a confirmation procedure to determine whether the one of the plurality of testing slots is repaired to be normal; and
   restarting the one of the plurality of testing slots if the one of the plurality of testing slots passes the confirmation procedure,
   wherein performing the confirmation procedure comprises:
      determining whether the one of the plurality of testing slots meets a pass condition by an examination test,
   wherein when the one of the plurality of testing slots is determined as not meeting the pass condition, the method comprises:
      collecting a fail data of the one of the plurality of testing slots from the examination test; and
      determining whether the fail data is abnormal,
   wherein the determining whether the fail data is abnormal comprises:
      predetermining a plurality of shutting down conditions; and
      determining whether the fail data meets at least one of the plurality of shutting down conditions,
   wherein the determining whether the fail data meets at least one of the plurality of shutting down conditions comprises:
      determining the fail data is normal when the fail data does not meet any of the plurality of shutting down conditions; and
      performing the examination test to the one of the plurality of testing slots continuously when a cumulative pass number is less than a first predetermined number.

6. The method of claim 5, wherein the determining whether the fail data meets at least one of the plurality of shutting down conditions comprises:
- determining the fail data is abnormal when the fail data meets at least one of the plurality of shutting down conditions; and
- zeroing a cumulative pass number of times the one of the plurality of testing slots has passed the examination test.

7. The method of claim 1, wherein the shutting down the one of the plurality of testing slots and sending the repairing notification comprises:
- sending an abnormal notification record.

8. A method of operating a testing system comprising a plurality of testing slots, the method comprising:
- testing the plurality of testing slots;
- obtaining a current testing data from the plurality of testing slots;
- determining whether one of the plurality of testing slots is abnormal by comparing the current testing data with a former testing data;
- shutting down the one of the plurality of testing slots and sending a repairing notification if the one of the plurality of testing slots is determined to be abnormal;
- performing a confirmation procedure to determine whether the one of the plurality of testing slots is repaired to be normal; and
- restarting the one of the plurality of testing slots if the one of the plurality of testing slots passes the confirmation procedure, wherein the determining whether one of the plurality of testing slots is abnormal comprises:
- predetermining a plurality of shutting down conditions;
- revising the former testing data with the current testing data to generate a revised data;
- comparing the former testing data and the revised data to obtain at least one difference; and
- determining whether the difference meets one of the plurality of shutting down conditions.

9. The method of claim 8, wherein the former testing data, the current testing data, and the revised data are stored in a cloud database.

10. The method of claim 9, wherein the plurality of shutting down conditions include a first condition and a second condition, and the first condition is that the difference is greater than a predetermined range.

11. The method of claim 10, wherein the second condition is that a number of times the difference meets the first condition is greater than or equal to a second predetermined number.

12. The method of claim 11, wherein when the first condition and the second condition are met at the same time, the one of the plurality of testing slots is abnormal.

13. The method of claim 11, wherein the second predetermined number is in a range from about 1 to about 3.

* * * * *